United States Patent
Nakao

(10) Patent No.: US 8,421,767 B2
(45) Date of Patent: Apr. 16, 2013

(54) INPUT DEVICE OF ELECTRONIC DEVICE, INPUT OPERATION PROCESSING METHOD, AND INPUT CONTROL PROGRAM

(75) Inventor: Masatoshi Nakao, Kanagawa (JP)

(73) Assignee: Panasonic Corporation, Osaka (JP)

( * ) Notice: Subject to any disclaimer, the term of this patent is extended or adjusted under 35 U.S.C. 154(b) by 304 days.

(21) Appl. No.: 12/810,841

(22) PCT Filed: Oct. 14, 2008

(86) PCT No.: PCT/JP2008/002897
§ 371 (c)(1),
(2), (4) Date: Jun. 26, 2010

(87) PCT Pub. No.: WO2009/084141
PCT Pub. Date: Jul. 9, 2009

(65) Prior Publication Data
US 2010/0283754 A1 Nov. 11, 2010

(30) Foreign Application Priority Data
Dec. 28, 2007 (JP) ................................. 2007-340243

(51) Int. Cl.
*G06F 3/041* (2006.01)

(52) U.S. Cl.
USPC .......................................... 345/173; 715/810

(58) Field of Classification Search .......... 345/156–179; 715/810–856; 178/18.01–18.09, 18.11
See application file for complete search history.

(56) References Cited

U.S. PATENT DOCUMENTS

| 2006/0181520 | A1 | 8/2006 | Ikegawa |
| 2007/0162872 | A1* | 7/2007 | Hong et al. .................... 715/828 |
| 2009/0249203 | A1* | 10/2009 | Tsuruta et al. ................ 715/702 |

FOREIGN PATENT DOCUMENTS

| JP | 2001236047 A | 8/2001 |
| JP | 2006-221568 A | 8/2006 |
| JP | 2006209418 A | 8/2006 |
| JP | 2006236143 A | 9/2006 |
| JP | 2007316760 A | 12/2007 |

OTHER PUBLICATIONS

International Search Report, PCT/JP2008/002897, International Filing Date Oct. 14, 2008.

* cited by examiner

*Primary Examiner* — Stephen Sherman
(74) *Attorney, Agent, or Firm* — Dickinson Wright PLLC

(57) ABSTRACT

It is made possible to cancel the effect of the already executed command without performing burdensome operation if an unobjective command is executed for input operation of the user.

An input signal analysis section 200 gives a command of execution of a first command corresponding to detection of input operation to a first operation button based on an input position of a touch panel 10 detected by an input signal control section 300 and if input operation to a second operation button is detected, gives a command of a second command corresponding to detection. If continuous input operation to the second operation button is detected after the first command corresponding to the first operation button is executed, and command change notification from the input signal analysis section 200 is received, an application 100 cancels the effect of the immediately preceding executed first command and executes the second command.

15 Claims, 13 Drawing Sheets

INPUT DEVICE OF ELECTRONIC DEVICE, INPUT OPERATION PROCESSING METHOD, AND INPUT CONTROL PROGRAM

TECHNICAL FIELD

This invention relates to an input device of an electronic device that can be used for input operation in an electronic device such as a mobile telephone terminal, a portable information terminal (PDA), a portable music player, or a portable gaming machine, for example.

BACKGROUND ART

In various electronic devices, recently a touch panel has often been used for an operation section for input operation of the user to improve operability of the user and decrease the number of mechanical operation buttons. When the user touches or presses any point on a plane with a finger, etc., the touch panel detects the input operation, detects the coordinates of the input position, and detects a change in the coordinates of the input position. Generally, the touch panel is placed in a state in which it is put on a display screen of a liquid crystal display, etc., and the positions of various operation buttons (or icons) displayed on the display screen in response to the situation and the coordinates on the touch panel are associated with each other. Accordingly, the need for a large number of mechanical operation buttons is eliminated and information representing the correspondence between the position of each displayed operation button and the coordinates on the touch panel and display on the display screen are simply changed, whereby it is made possible to change the positions, the number, the shapes, etc., of the operation buttons without changing hardware.

In this kind of input device, generally control is performed so as to execute the command previously assigned to the corresponding operation button or icon if the input operation (for example, pressing the touch panel) is detected in a specific operation range matching the range of the display area of each operation button and icon displayed on the display screen.

For example, for a terminal of a personal computer etc., to operate an operation button or an icon displayed on a screen, a mouse cursor, etc., is displayed on the screen, the operation position on the screen is grasped, the mouse cursor is moved in accordance with operation of a mouse or a keyboard, and when the mouse cursor exists at the position matching the displayed operation button or icon, if the user performs operation of click, etc., the input operation is accepted.

However, for an electronic device with a comparatively small display screen such as a mobile telephone terminal, for example, the operation button and the icon displayed on the screen must also be made small. Thus, particularly when the user presses a touch panel with a finger, thereby performing input operation, the range of the area where the operation button to be operated by the user is displayed and the position actually pressed by the user with a finger, etc., shift easily and a situation in which the user repeats pressing the same operation button until the user presses the correct position and starts desired operation also occurs. The user may want to cancel once performed operation and operates any other operation button, etc.

Even a device for displaying visible information (display elements forming a graphical user interface: Also called Widget) such as an operation button and an icon on a screen for touch panel operation or operation using a mouse cursor, etc., may temporarily erase display. For example, to display content of a moving image like a TV program or a still image like a photo on a comparatively small screen, the possibility that when content is viewed, display of each operation button and icon may obstruct the view for the user is high. Thus, even an operation button in an operable state on the screen is switched to a non-display state and the system waits for input operation from the user and only if actual operation is detected, the operation button is switched from the non-display state to a display state.

Thus, the user can also operate an operation button and an icon in the non-display state and may actually operate them. That is, if the user is familiar with the electronic device, the user retains the position of each operation button in the display state in memory and thus operates the proximity of the hidden area where the desired operation button can exist by pressing the touch panel or using the mouse cursor, etc.

However, to operate an operation button or an icon in the non-display state, the position cannot be recognized with eyes and the user must rely only on his or her memory and intuition and registration is difficult to perform. Thus, the user attempts to operate the objective operation button (in a non-display state) existing on a screen, for example, a position shift simply occurs and in addition, another operation button existing at a position adjacent to the objective operation button may be operated by mistake.

As a related art to solve such problems and improve the operability of the user, for example, arts disclosed in Patent Document 1 is known. In Patent Document 1, when bringing a finger close to a touch panel is recognized according to a signal from a camera, the icon in the proximity of the target position is enlarged on display. Accordingly, if the screen is small, when the touch panel is operated, each icon can be recognized in an enlarged state and thus it becomes easy to grasp the position.

A function to cancel erroneous input operation already performed by the user is built in standard software used with a personal computer, etc. That is, the state before the input operation is performed is stored and after any command is executed in accordance with the input operation, the user selects a specific command out of a menu, etc., whereby the state before the immediately preceding operation is executed is restored.

For example, in a related art disclosed in Patent Document 2, if a large number of items that can be adjusted by input operation exist, a mark is put on the setup value of the previously adjusted item, whereby the user can easily check the setup value before and after adjustment, so that operation to restore to the state before adjustment is easy to perform.

Patent Document 1: Japanese Patent Laid-Open No. 2006-236143
Patent Document 2: Japanese Patent Laid-Open No. 2001-236047

DISCLOSURE OF THE INVENTION

<Problems to be Solved by the Invention>

However, in the related art, to cancel the immediately preceding executed command by erroneous operation of the user, the user must operate so as to select a special cancel command provided in the menu and thus comparatively cumbersome operation becomes necessary.

Particularly, for example, if the user operates an operation button in a non-display state through a touch panel, the object operation button or another operation button is displayed by erroneous input operation of a position shift and the user immediately is aware of an operation error (position shift) and the user attempts to correct the position shift of the operation position and perform correct input operation. However, if another command is already executed by the erroneous input operation, the user must select a cancel command to cancel the effect of the immediately preceding executed command before performing correct input operation and must perform cumbersome operation of a move of a finger and press the touch panel repeatedly to select a menu, etc.

In view of the circumstances described above, it is an object of the invention to provide an input device, an input operation processing method, and an input control program of an electronic device that can cancel the effect of the already executed command without performing burdensome operation if an un-objective command is executed for input operation of the user.

<Means for Solving the Problems>

An input device of an electronic device according to the invention is an input device of an electronic device including an input section having an input function having input position information and an input control section for giving a command of processing for input operation based on an input signal of the input section, wherein the input control section has an input position detection section for detecting an input position in the input section; a command execution control section that can execute a first command assigned to a first area in the input section and a second command assigned to a second area different from the first area; an input signal analysis section for giving a command of execution of the first command if input operation to the first area is detected and giving a command of execution of the second command if input operation to the second area is detected based on the input position detected by the input position detection section; and an input operation cancel control section for executing cancel processing to cancel the effect of the immediately preceding executed first command if continuous input operation to the second area is detected after execution of the first command with detection of input operation to the first area by the input signal analysis section.

Accordingly, if continuous input operation to the second area is detected after execution of the first command with detection of input operation to the first area, cancel processing to cancel the effect of the immediately preceding executed first command is executed, whereby if an unobjective command is executed, burdensome operation of performing additional cancel operation, etc., is not required and it is made possible to cancel the effect of the already executed command by simple operation.

The invention contains the input device of the electronic device described above, including a display section that can display visible information concerning input operation and a touch panel having an input function based on contact operation with an input face corresponding to a display screen of the display section as the input section, wherein if continuous operation of a contact state from the first area to the second area is detected, the input signal analysis section determines that the operation is continuous input operation from the first area to the second area.

Accordingly, when the touch panel is included, if continuous operation of a contact state from the first area to the second area is detected, it is determined that the operation is continuous input operation from the first area to the second area, and cancel processing is executed, whereby it is made possible to easily cancel the effect of the already executed command by such continuous operation.

The invention contains the input device of the electronic device described above, wherein if input operation to the second area is detected within a predetermined time from the detection time of the input operation start to the first area or the execution time of the first command accompanying the input operation, the input operation cancel control section executes the cancel processing and makes the cancel processing ineffective after a lapse of the predetermined time.

Accordingly, if input operation to the second area is detected within the predetermined time from the execution time of the first command, the cancel processing is executed and the cancel processing is made ineffective after a lapse of the predetermined time, whereby command cancel is made effective in the predetermined time and later, cancel processing can be limited.

The invention contains the input device of the electronic device described above, including a display section that can display visible information concerning input operation and a screen display control section for controlling the display state of an object to be operated displayed on a display screen of the display section, wherein the screen display control section displays objects to be operated at display screen positions corresponding to operation areas containing the first area and the second area and if the object is in a non-display state and input operation to the corresponding area is detected, places some or all of the objects containing the object corresponding to the input position in a display state, and wherein if input operation to the second area is detected within a predetermined time from the detection time of the input operation start to the first area or the execution time of the first command accompanying the input operation, the input operation cancel control section executes the cancel processing and makes the cancel processing ineffective after a lapse of the predetermined time.

Accordingly, when the object to be operated is switched from the non-display state to the display state with input operation, if input operation to the second area is detected within the predetermined time, cancel processing can be executed and correction of operation in the non-display state can be handled.

The invention contains the input device of the electronic device described above, wherein if the object is in the non-display state and input operation to the corresponding area is detected, the screen display control section places the object corresponding to the input position and at least one different object in a display state and places the object other than the object corresponding to the input position in the non-display state when a predetermined time has elapsed since the display state, and wherein when the different object is in the display state, if input operation to the different object is detected, the input operation cancel control section determines that the operation is continuous input operation from the first area to the second area and executes the cancel processing and if an object other than the object corresponding to the input position is switched from the display state to the non-display state, makes the cancel processing ineffective.

Accordingly, cancel processing can be executed in the time period during which a different object other than the input position is in the display state, and correction operation to the displayed different object can be handled. The different object is displayed, whereby position correction operation is facilitated.

An input operation processing method of the invention is an input operation processing method in an input device of an electronic device, including an input section having an input function having input position information and an input control section for giving a command of processing for input operation based on an input signal of the input section, and in the input control section, the input operation processing method has an input position detection step of detecting an input position in the input section; a command execution control step of executing a first command assigned to a first area in the input section and a second command assigned to a second area different from the first area based on input operation; an input signal analysis step of giving a command of execution of the first command if input operation to the first area is detected and giving a command of execution of the second command if input operation to the second area is detected based on the input position detected by the input position detection step; and an input operation cancel control step of executing cancel processing to cancel the effect of the immediately preceding executed first command if continuous input operation to the second area is detected after execution of the first command with detection of input operation to the first area by the input signal analysis step.

The invention provides an input control program for causing a computer to the steps of the input operation processing method described above.

The invention provides an electronic device installing an input device described above.

<Advantages of the Invention>

According to the invention, there can be provided an input device, an input operation processing method, and an input control program of an electronic device that can cancel the effect of the already executed command without performing burdensome operation if an un-objective command is executed for input operation of the user.

DESCRIPTION OF REFERENCE NUMERALS

Figure 1:
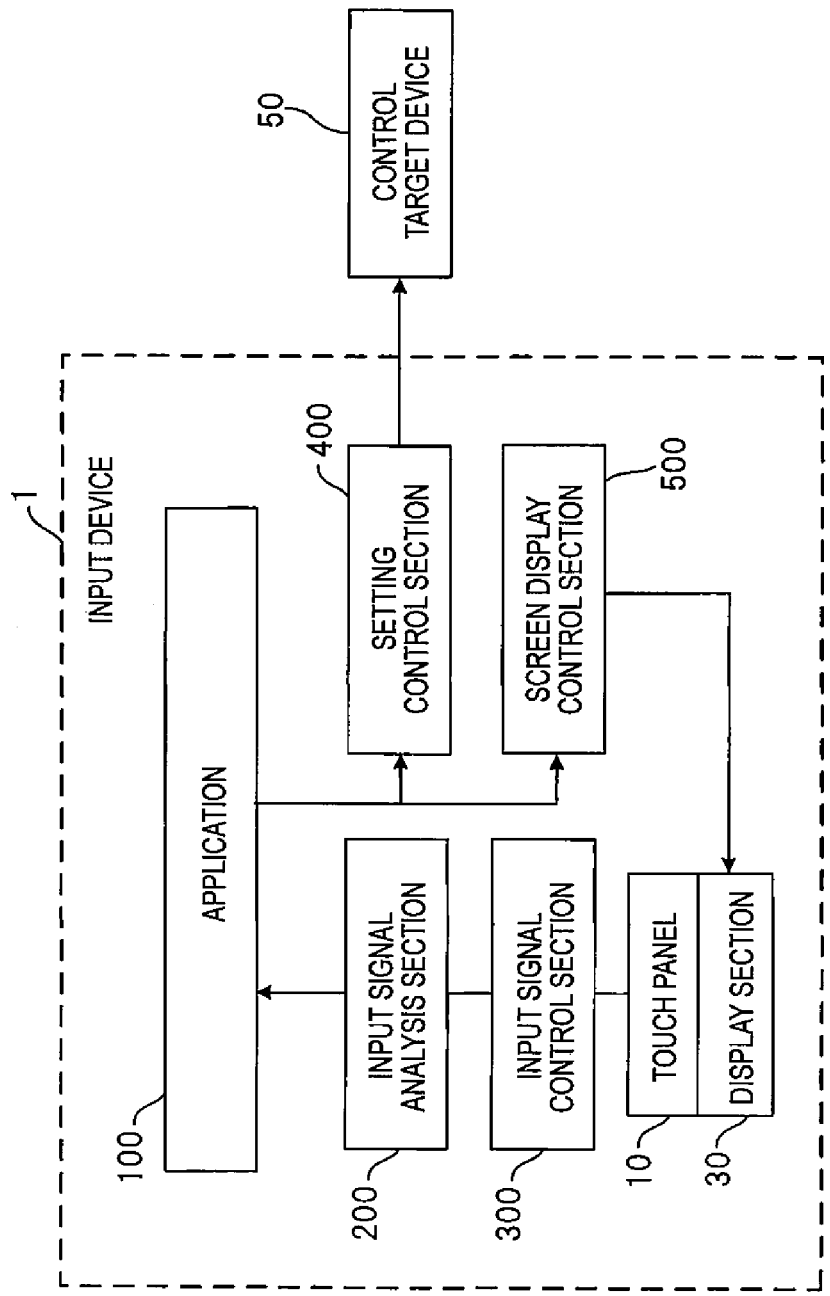
FIG. 1 is a block diagram to show the configuration of the main part of an input device of an electronic device in an embodiment of the invention.

1 Input device
10 Touch panel
30 Display section
31 Display screen
32, 35 Operation button
34 Move trace
50 Control target device
100 Application
200 Input signal analysis section
210 Command assignment table
300 Input signal control section
400 Setting control section
500 Screen display control section

BEST MODE FOR CARRYING OUT THE INVENTION

In each of the following embodiments, a configuration example of applying to a mobile electronic device such as a mobile telephone terminal is shown as an example of an input device of an electronic device.

(First Embodiment)

FIG. 1 is a block diagram to show the configuration of the main part of an input device of an electronic device in an embodiment of the invention.

The input device of the embodiment is a device assumed for the user to perform input operation for an electronic device such as a mobile telephone terminal, a portable information terminal (PDA), a portable music player, or a portable gaming machine, for example. The input device is installed in an electronic device and includes a touch panel having an input function by contact operation of touch, trace, etc., on an input face on a display section.

An input device 1 shown in FIG. 1 is made up of a touch panel 10, a display section 30, an application 100, an input signal analysis section 200, an input signal control section 300, a setting control section 400, and a screen display control section 500. An electronic device installing the input device 1 is provided with a control target device 50 of a sound output section, etc., of a loudspeaker, a headphone, etc.

The touch panel 10 is an input device for operation functioning as an example of an input section and contains a transparent pressure sensitive sheet formed like a flat face and outputs a signal representing the presence or absence of contact on a face of the pressure sensitive sheet and coordinate information of the contact detection position at regular time intervals. Therefore, the user presses (touches) the surface of the pressure sensitive sheet with his or her finger or using a stylus pen, etc., whereby a signal indicating the contact and coordinate information of the input position are output. The touch panel 10 may be formed using any other detection element than the pressure sensitive sheet, such as an electrostatic touch panel if it can detect the presence or absence of contact and the coordinates of the contact input position.

The display section 30 is a device that can display various pieces of visible information such as text, a pattern, and an image on a flat display screen and is implemented as a liquid crystal display, etc. The touch panel 10 is put on the display screen of the display section 30, forming an input face. Therefore, the user can touch a specific position (a position where an operation button, etc., is displayed) on the touch panel 10 while checking the content of the display screen of the display section 30 according to light passing through the touch panel 10. Display of each operation button may be temporarily erased from the display screen of the display section 30 as a non-display state, but input operation can also be performed for the operation button in the non-display state.

The application 100 is a program (middleware) for providing an interface for transferring various pieces of data, control information, etc., between each high-order individual application program (for example, a program for providing a music playback function) and the input device 1 for providing an input operation function. The application 100 executes the corresponding command based on a control signal sent from the input signal analysis section 200 and gives a command to the setting control section 400 and the screen display control section 500. At this time, it also manages the display state/non-display state of each operation button on the display screen of the display section 30.

The application 100 monitors the input operation of the user and checks the presence or absence of erroneous operation or operation cancel and if erroneous operation or operation cancel occurs, the effect of the command already executed by the operation is canceled and then a correct command is executed as described later in detail. Canceling the command is executed with a command change notification sent from the input signal analysis section 200 as a trigger.

The input signal control section 300 controls acceptance of a signal output from the touch panel 10 of an input device. Specifically, whether or not a signal input from the touch panel 10 is noise is checked and if an appropriate signal which is not noise is detected, the input position on the input face is detected and information representing the present or absence of contact and the contact position coordinates is sent to the input signal analysis section 200 at given intervals.

The input signal analysis section 200 analyzes the information input from the input signal control section 300, thereby associating the input operation of the user with a previously assigned command, and outputs a control signal for executing the corresponding command. Specifically, the operation of an operation state corresponding to simple button pressing (contact on), an operation state representing release of pressing (contact off), a move trace when the contact position is moved while it is pressed (displacement of contact position), etc., and the coordinates of the operation positions (input coordinates) are detected. Erroneous operation or operation cancel for each operation button is detected and a command change notification is output to the application 100. The further detailed operation is described later. The analysis result of the input signal analysis section 200 is input via the application 100 to the setting control section 400 or the screen display control section 500.

The setting control section 400 manages various parameters used when the electronic device operates, and controls the target section. For example, the setting control section 400 manages a sound volume adjustment parameter for adjusting the sound volume when music is played back, a sound quality adjustment parameter for adjusting the sound quality, etc. The parameters are given to the control target device (for example, an amplifier) 50.

The screen display control section 500 controls display of an object to be operated on the display screen of the display section 30 and performs display control of displaying the operation button as an example of the object to be operated as visible information (display of an image resembling a physical operation button) or erasing the display. The screen display control section 500 also manages a luminance adjustment parameter for adjusting the luminance on the display screen of the display section 30, etc., and controls the display section 30. In the description of the embodiment, the operation button is illustrated as the object to be operated; however, the objects to be operated include the objects to be operated displayed as visible information, such as a button, a knob, a switch, a wheel, a slide bar, and an icon.

In the configuration described above, the input signal analysis section 200, the input signal control section 300, the setting control section 400, the screen display control section 500, and the application 100 implement the function of an input control section. The input signal control section 300 implements the function of an input position detection section and the application 100 implements the function of an input operation cancel control section. The input signal analysis section 200 may implement the functions of an input signal analysis section and an input operation cancel control section.

To make sound volume adjustment (volume adjustment), from the setting control section 400, the value of the sound voltage adjustment parameter is input to the sound signal output amplifier of the control target device 50 as a control signal for adjusting the gain. For example, if the user performs input operation for sound volume adjustment for the touch panel 10, the input signal analysis section 200 recognizes the input operation and the recognition result is input through the application 100 to the setting control section 400, and the sound volume adjustment parameter in the setting control section 400 is changed. Accordingly, the gain of the amplifier to be controlled changes and the output sound volume from the sound output section changes.

Figure 2:
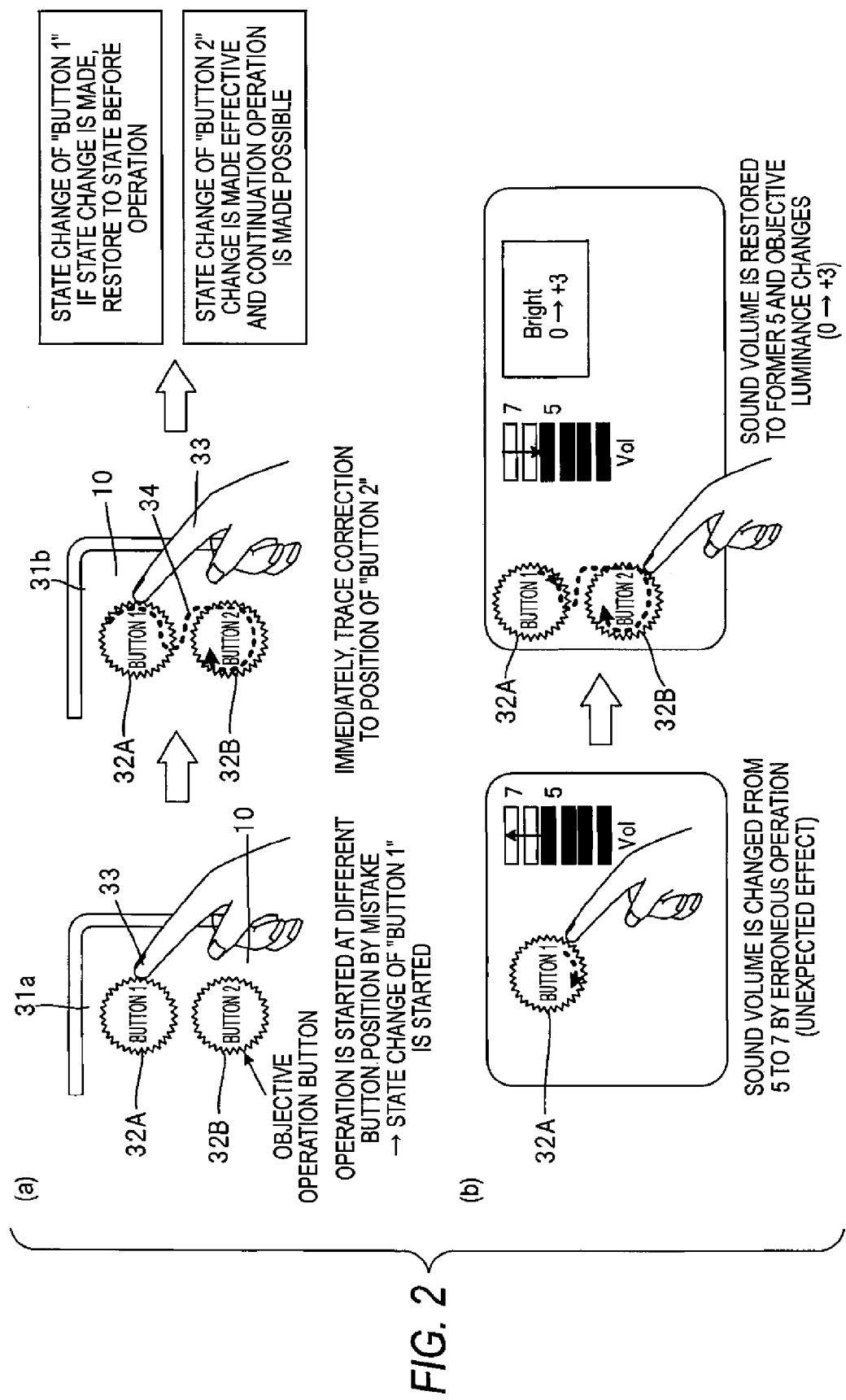
FIG. 2 is a schematic drawing to show a specific example of a display screen and operation in the input device of the first embodiment.

FIG. 2 is a schematic drawing to show a specific example of the display screen and the operation in the input device of the first embodiment. The specific example of the operation of the input device according to the first embodiment will be discussed with reference to FIG. 2. A display screen of the display section 30 displays operation button 32A, 32B, etc., of visible information having a circular shape imitating an operation knob of a volume, etc., as shown in FIG. 2. The user can touch and operate the touch panel 10 with a finger 33 while seeing the display of the screen, namely, visible information of the operation buttons 32A and 32B on the touch panel according to light passing through the touch panel 10 put on the screen.

At this time, if the user performs input operation for the inside of the area matching the display range of the visible information of each operation button 32A, 32B displayed on the display screen, the input device accepts the input operation and executes a predetermined command. In the description of the embodiment, it is assumed that the user performs continuous input operation such as continuous operation of circular motion of rotating an operation button and the state of the sound volume, the sound quality, the luminance, the playback position, etc., is continuously changed for the continuous operation as a command corresponding to the input operation. Each of the operation buttons 32A and 32B shown in FIG. 2 is assigned a function of accepting input operation of move (drag) like rotation.

In an example shown in FIG. 2 (*a*), although the objective button is the operation button 32B, the user starts to operate the operation button 32A as on a display screen 31*a* on the left of the figure by mistake and immediately after the operation, the use is aware of an error and corrects the operation as on a display screen 31*b* on the right of the figure. In this case, the user operates so as to draw a move trace 34 from the operation button 32A to the operation button 32B and moves the operation position by continuous operation with the finger 33 touching the touch panel 10 for making a transition to operation of the operation button 32B.

To execute general control, when the operation button 32A first is operated, the command assigned to the operation button 32A is executed and then the command assigned to the operation button 32B is executed. In this case, the result not intended by the user is obtained for the command of the operation button 32A already executed by erroneous operation. Then, in the embodiment, if the user performs continuous input operation for correcting the operation position as shown in FIG. 2 (a), when a transition is made to the operation of the operation button 32B, processing for canceling the effect of the command of the operation button 32A is executed and then the command for the operation of the operation button 32B is executed. Therefore, when the user is aware of the erroneous operation, the user performs correct operation by continuous operation, whereby the effect of the command executed by the erroneous operation can be canceled without performing special cancel operation.

In an example shown in FIG. 2 (b), it is assumed that a sound volume adjustment function (command) is assigned to the operation button 32A and a screen luminance adjustment function is assigned to the operation button 32B. In this case, the sound volume is changed from "5" to "7" by operating the operation button 32A by erroneous operation of the user and then the user who is aware of the error makes a transition to operation of the operation button 32B and changes the luminance from "0" to "+3." For the operation, the change in the sound volume concerning the first operation button 32A is automatically canceled and the sound volume is restored to "5" and change to luminance "+3" concerning the next correction operation button 32B is executed.

Here, it is assumed that the condition for assuming that the input operation is continuous is the case where the time until the operation target button is switched is within a predetermined time, the case where a finger is moved between buttons with the finger touching the touch panel 10, etc.

Figure 3:
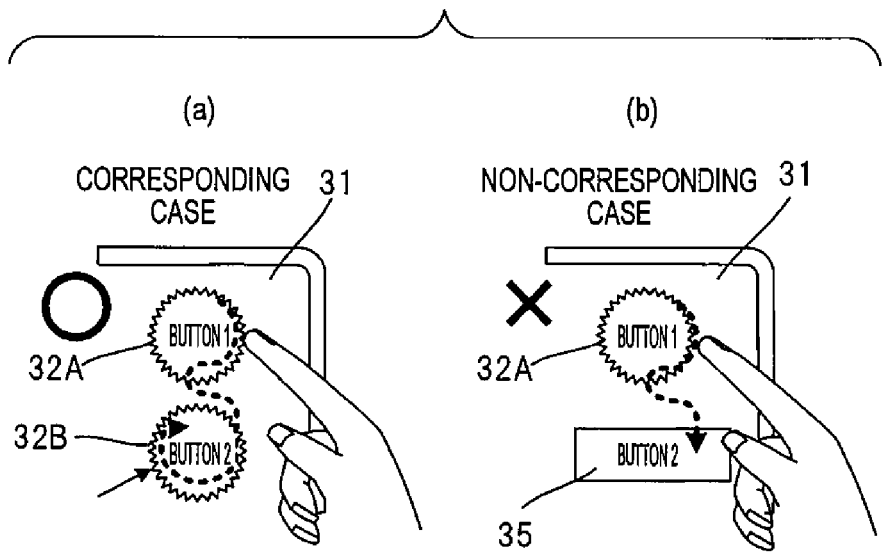
FIG. 3 is a schematic drawing to show the correspondence between the operation buttons concerning command execution cancel in the embodiment.

FIG. 3 is a schematic drawing to show the correspondence between the operation buttons concerning command execution cancel in the embodiment. In the embodiment, if the operation position is corrected between similar types of operation buttons, command execution is canceled, but if the user moves a finger between different types of operation buttons, the operation is not assumed to be continuous input operation and command execution cancel is not executed.

In an example shown in FIG. 3 (a), it is assumed that the user moves the finger 33 between the same types of operation buttons 32A and 32B accepting rotation operation on the display screen 31. In this case, the operation is assumed to be continuous input operation and command execution corresponding to the operation button 32A is canceled and the command corresponding to the operation button 32B is executed. On the other hand, in an example shown in FIG. 3 (b), it is assumed that the user moves the finger 33 between the operation button 32A accepting rotation operation of continuous operation with the finger touching the display screen 31 and an operation button 35 accepting sole press operation. In this case, the types of operation buttons differ and the operation differs and thus the operation is not assumed to be continuous input operation and command execution corresponding to the operation button 32A is not canceled. If a finger is moved between an operation button accepting rotation operation and a slider bar accepting slide operation, each operation is continuous move operation with a finger touching and thus the operation is assumed to be continuous input operation and processing is performed.

Figure 4:
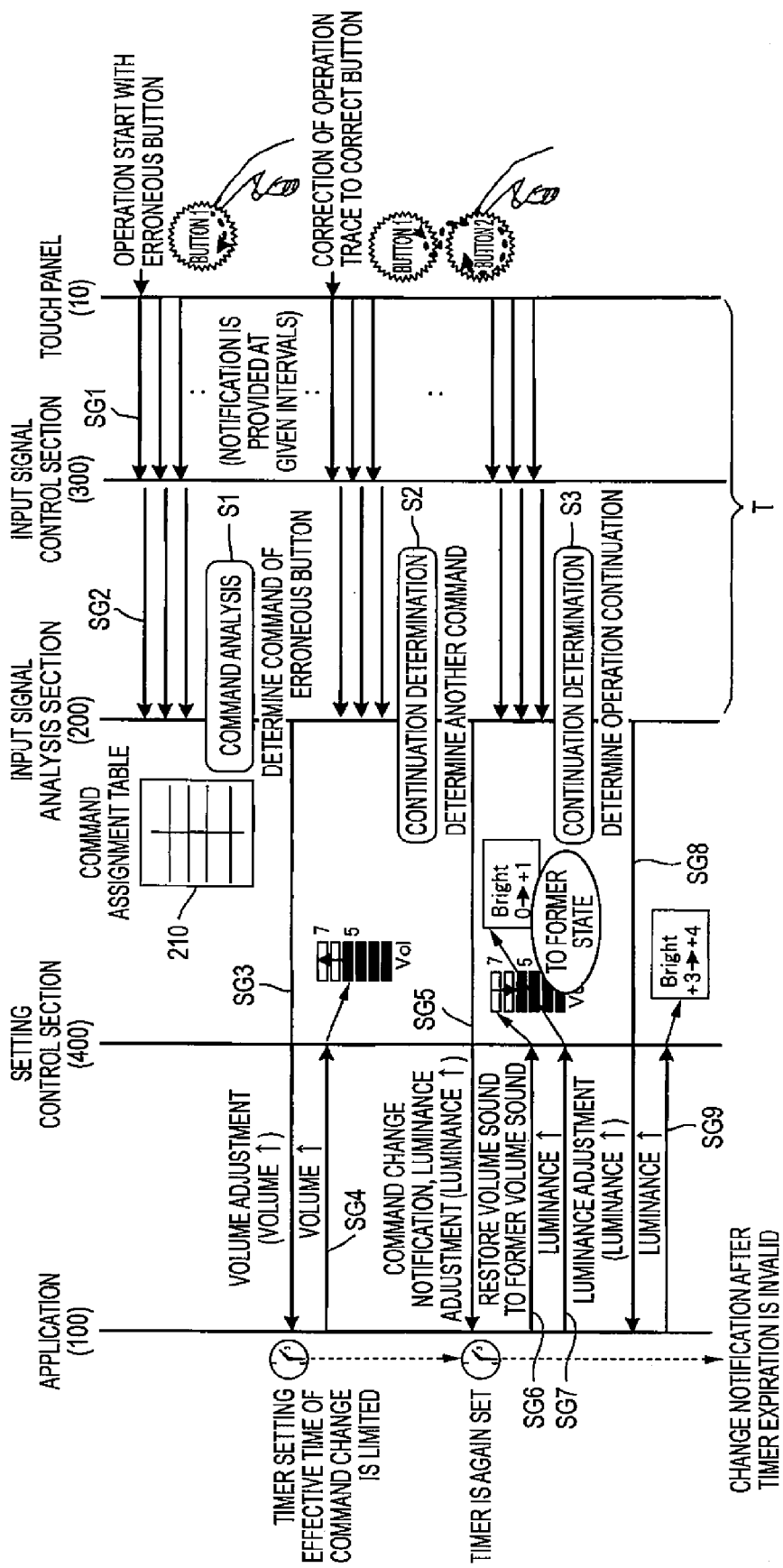
FIG. 4 is a sequence chart to show the main operation in the input device of the first embodiment.

Next, a specific processing procedure of the input device according to the first embodiment will be discussed with reference to FIG. 4. FIG. 4 is a sequence chart to show the main operation in the input device of the first embodiment.

When the user touches the touch panel 10 to perform input operation, if the user comes in contact with the touch panel 10, an operation detection signal SG1 containing coordinate information representing the input position on the touch panel 10, etc., is output to the input signal control section 300 in a given period. The input signal control section 300 removes noise from the operation detection signal SG1 output by the touch panel 10 and gives only effective information to the input signal analysis section 200 as an operation signal SG2. In T between components shown on the right of FIG. 3, input coordinate information from the touch panel 10 is continuously sent through the input signal control section 300 to the input signal analysis section 200.

The input signal analysis section 200 analyzes a command associated with the current input operation at step S1. That is, the input position and the move trace, etc., based on the input operation signal SG2 and determines the corresponding command using a command assignment table 210 previously set and held.

At this time, the input signal analysis section 200 first acquires the input coordinates indicating the input position when operation is started, references the command assignment table 210, and determines whether or not the operation button corresponding to the coordinate position is stipulated. If the corresponding operation button exists, the input signal analysis section 200 selects the command assigned to the operation button and gives command information to the application 100 for executing the corresponding command. The command is executed at given time intervals for input by operation of continuously changing the input coordinates; the command is executed when a finger of the user leaves the touch panel 10, etc., for input by single operation.

At this time, a command signal SG3 corresponding to the input operation is given from the input signal analysis section 200 to the application 100, a setting control signal SG4 is given from the application 100 to the setting control section 400, and the value of the parameter corresponding to the command is changed. In the example in FIG. 4, it is assumed that the user operates the operation button assigned to sound volume adjustment (sound volume adjustment button) and thus command signal SG3 of sound volume adjustment (volume adjustment: Sound volume increase) is sent from the input signal analysis section 200 to the application 100, the application 100 sends setting control signal SG4 of sound volume increase to the setting control section 400, and the value of the sound volume adjustment parameter is changed. Accordingly, the sound volume adjustment parameter in the setting control section 400 is increased from the current sound volume value (in the example in FIG. 4, 5->7).

The application 100 starts a timer for measuring the effective time period of command change and accepts command change notification if an operation button accepting any other similar operation is continuously operated until the timer expires.

Then, the input signal analysis section 200 determines continuation operation at step S2 and detects continuous input operation and at the time, determines whether operation of the same operation button is continued or the operation position moves to another operation button. If operation of a different operation button (in the example, luminance adjustment button) from the input operation detected at step S1 is continuously detected and the operation is determined to be correction operation indicating another command, the input signal analysis section 200 sends command change notification and a command signal SG5 of luminance adjustment (luminance increase) to the application 100. The application 100 sends a setting control signal SG6 of sound volume restoration to the setting control section 400 to cancel the immediately preceding command (sound volume adjustment) and further sends a setting control signal SG7 of luminance increase to the setting control section 400 to execute the command (luminance adjustment) corresponding to the correct input operation. Accordingly, the sound volume adjustment parameter in the setting control section 400 is restored to the former sound volume value (in the example in FIG. 4, 7->5) and the luminance adjustment parameter is increased from the current luminance value (in the example in FIG. 4, 0->+1).

The input signal analysis section 200 further determines continuation operation at step S3 and detects continuous input operation and at the time, determines whether operation of the same operation button is continued or the operation position moves to another operation button. If operation of the same operation button (luminance adjustment button) as the input operation detected at step S2 is continuously detected and the operation is determined to be continuation operation indicating the same command, the input signal analysis section 200 sends a command signal SG8 of luminance adjustment (luminance increase) to the application 100 and the application 100 sends a setting control signal SG9 of luminance increase to the setting control section 400 for further making a luminance adjustment (in the example, +3->+4).

Figure 5:
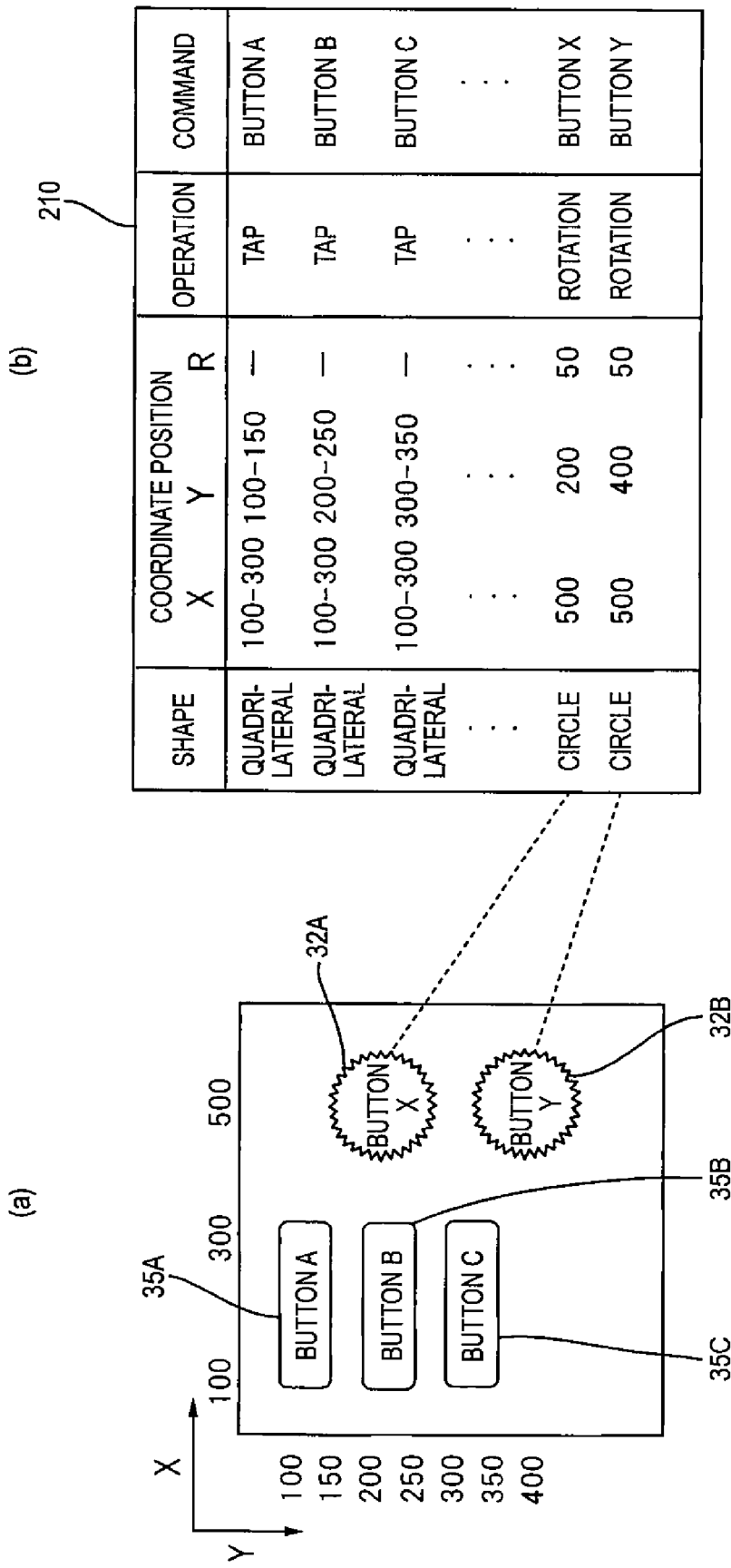
FIG. 5 is a schematic drawing to show specific examples of a display screen and its corresponding command assignment table in the input device of the first embodiment.

FIG. 5 is a schematic drawing to show specific examples of a display screen and its corresponding command assignment table in the input device of the first embodiment. In FIG. 5, (a) shows operation buttons displayed on the display screen 31 of the display section 30 and (b) shows the contents of the command assignment table 210 corresponding to the operation buttons in (a). Circular operation buttons 32A and 32B each imitating an operation knob of a volume and rectangular operation buttons 35A, 35B, and 35C each imitating a push button are placed on the display screen 31 of the display section 30. On the other hand, the command assignment table 210 registers information representing the shape of each operation button, the display range of the operation button according to the coordinate position (X, Y) and the size (radius R) of the operation button, the description of operation corresponding to the operation button (tapping, rotation, etc.,), and the type of command to be executed (button X, button Y, etc.,) for each operation button as information associated with the input operation. Therefore, at step S1, etc., in FIG. 4, the contents of the command assignment table 210 are referenced and are compared with the input coordinates of the input operation signal SG2 and the move trace, whereby the command to be executed can be determined.

Figure 6:
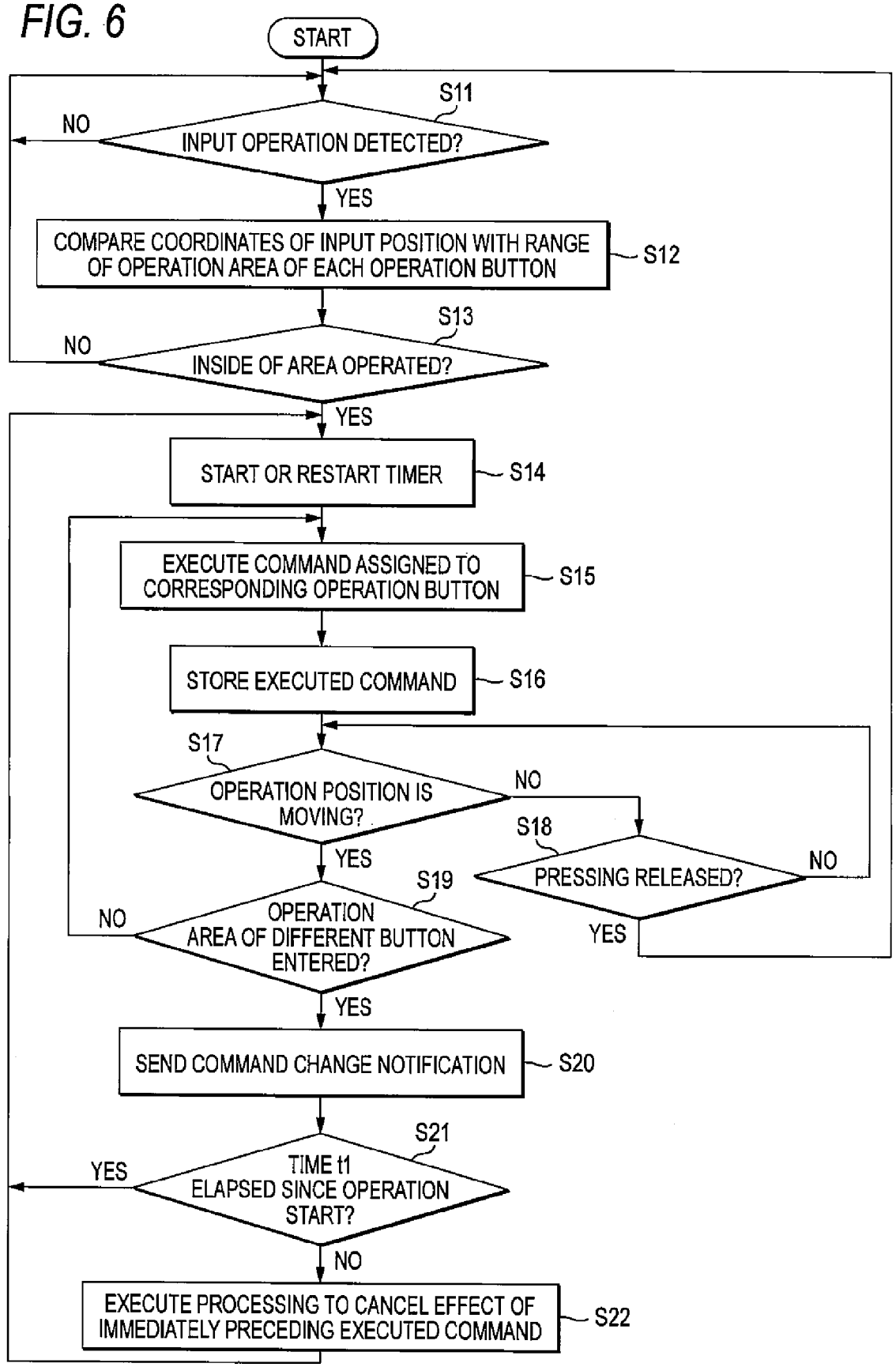
FIG. 6 is a flowchart to show processing of command execution cancel operation in the first embodiment.

The more detailed operation of the embodiment will be discussed with reference to FIG. 6. FIG. 6 is a flowchart to show processing of command execution cancel operation in the first embodiment. The processing shown in FIG. 6 is executed with detection of input operation to the touch panel 10 mainly in the input signal analysis section 200 and the application 100. In the description, the case where continuous operation of rotation operation, etc., is performed is assumed.

At step S11 in FIG. 6, the input signal analysis section 200 determines whether or not input operation is detected. If input operation is detected, the input signal analysis section 200 goes to step S12. That is, the input signal analysis section 200 determines whether or not input operation is detected based on the operation signal SG2 output by the input signal control section 300 for the operation detection signal SG1 output from the touch panel 10.

At step S12, the input signal analysis section 200 makes a comparison between the coordinates of the input position detected by the touch panel 10 and the range of the operation area concerning each operation button registered in the command assignment table 210. Generally, the operation area is determined to be equal to the display range of visible information of each operation button, but may be changed conforming to the situation. Here, at step S13, the input signal analysis section 200 determines whether or not the inside of the operation area corresponding to the display range of the visible information is operated. If it is detected that a position inside the operation area is operated as the comparison result at step S13, the process goes to step S14; if it is detected that a position outside the operation area is operated, no reaction is performed.

At step S14, the application 100 starts or restarts a timer to limit the effective time of command change according to the elapsed time since the operation start.

At step S15, the input signal analysis section 200 recognizes a specific command associated with the operation button matching the operation position in accordance with the contents of the command assignment table 210 and sends the command signal SG3 corresponding to the command to the application 100 and the application 100 executes the command. In the example in FIG. 4, the application 100 sends the setting control signal SG4 to the setting control section 400 in accordance with the command signal SG3 sent by the input signal analysis section 200 and the volume sound, etc., is adjusted.

At step S16, the application 100 stores the command executed at step S15 as the immediately preceding command.

At step S17, the input signal analysis section 200 monitors information of the operation position according to the operation signal SG2 and checks whether or not the operation position is moving. If the operation position is moving, the input signal analysis section 200 goes to step S19; if the operation position is not moving, the input signal analysis section 200 goes to step S18.

At step S18, the input signal analysis section 200 determines whether or not pressing the touch panel 10 (finger contact, etc.,) is released. If pressing is not released, the input signal analysis section 200 returns to step S17; if pressing is released, the input signal analysis section 200 returns to step S11.

At step S19, the input signal analysis section 200 makes a comparison like step S12, S13 and determines whether or not a different operation button from the previously operated operation button (limited to similar type) is continuously operated. If a different operation button is operated, the input signal analysis section 200 goes to step S20; otherwise, the input signal analysis section 200 returns to step S15.

At step S20, the input signal analysis section 200 sends command change notification to the application 100.

At step S21, the application 100 checks the timer and determines whether or not a predetermined time t1 (for example, two seconds) has elapsed since the operation start. If the time t1 has not yet elapsed, the application 100 goes to step S22; if the time t1 has elapsed, the application 100 returns to step S14.

At step S22, the application 100 executes processing to cancel the effect of the immediately preceding executed command (the command stored at step S16).

For example, as shown in FIG. 2, after the user first operates the operation button 32A by mistake, if the user is aware of the error and immediately corrects and changes the operation position of the finger 33 and continuously operates the operation button 32B, first the command corresponding to the operation button 32A (sound volume adjustment) is executed at step S15 in FIG. 6 for the first operation of the operation button 32A. However, if the user moves the finger 33 to the area of the operation button 32B within the time t1 without releasing the finger 33 from the touch panel 10, step S22 is executed through step S17-S19-S20-S21 in FIG. 6 and the effect of the first command (sound volume adjustment) is automatically canceled. At step S15, the command corresponding to the operation button 32B (luminance adjustment) is also executed.

However, if the user releases the finger from the touch panel 10 midway or makes a transition to operation of another operation button after the time t1 has elapsed since the operation start, the operation is not assumed to be continuous input operation and thus the effect of the immediately preceding executed command is not canceled and subsequently the command corresponding to the later operation is executed or the subsequent operation is made ineffective.

Figure 7:
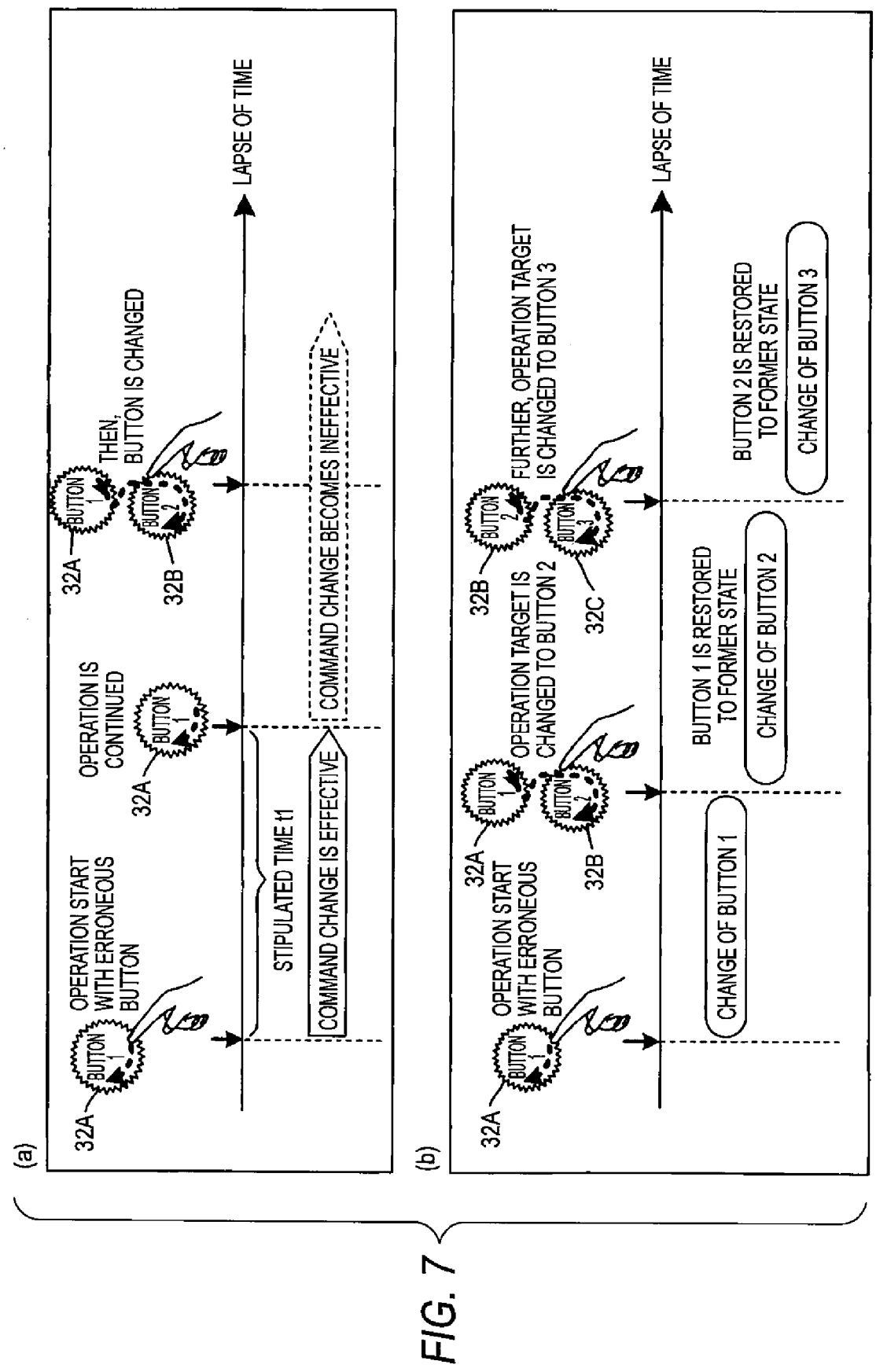
FIG. 7 is a time chart to show an operation example at the command change time in the first embodiment.

FIG. 7 is a time chart to show an operation example at the command change time in the first embodiment. FIG. 7 (a) shows the case where the user first operates the operation button 32A and continues to operate the same operation button 32A after a lapse of time t1 and then makes a transition to operation of the different operation button 32B. In this case, since the time 1 has elapsed since the operation start, the operation is not assumed to be continuous operation and command change (cancel) becomes ineffective.

FIG. 7 (b) shows the case where the user first operates the operation button 32A and then makes a transition to operation of the operation button 32B and further makes a transition to operation of an operation button 32C. In this case, command cancel is executed as long as the condition of continuous operation is satisfied. That is, the user makes a transition to operation of the operation button 32B within the time t1 from operation of the operation button 32A and makes a transition to operation of the operation button 32C within the time t1 from the point in time, the operation is assumed to be continuous operation unless the user releases his or her finger from the touch panel 10 midway. Therefore, when the user makes a transition to operation of the operation button 32B, the effect of the command for the operation button 32A and the command for the operation button 32B is executed and when the user makes a transition to operation of the operation button 32C, the effect of the command for the operation button 32B and the command for the operation button 32C is executed.

Thus, not only in the case where erroneous operation occurs because of an operation mistake, etc., but also in the case where erroneous operation occurs because of misunderstanding, etc., for example, of the user and the user wants to cancel the operation, the user performs correct operation as continuous operation, whereby the effect of the command executed by the first operation is automatically canceled. Thus, it becomes unnecessary for the user to perform special input operation for cancel (for example, selection of a cancel command out of a menu).

In the input device of the embodiment, when the user is aware of operation of a different operation button from the object because of a position shift of the operation position, an operation mistake, etc., the user corrects the operation position without releasing a finger from the touch panel and continuously operates the objective operation button, whereby the effect of the command executed by the immediately preceding operation can be canceled and the operability at the operation correction and cancel time can be improved. Command cancel is made effective for the predetermined time from the input operation of the user and command cancel is made ineffective after a lapse of the predetermined time, so that acceptance of command cancel is limited and intentional cancel operation of the user and any other operation can be clearly distinguished.

(Second Embodiment)

Figure 8:
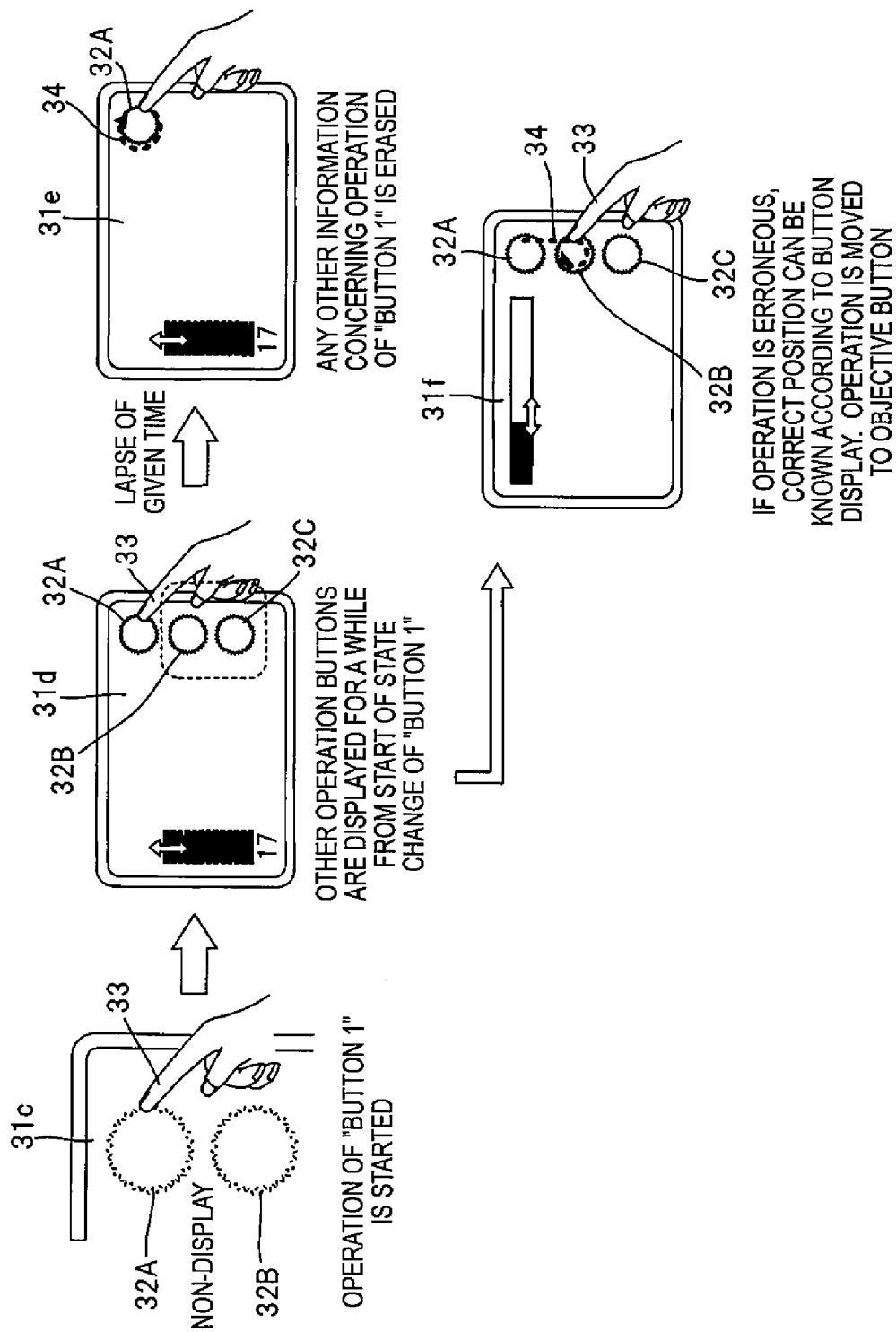
FIG. 8 is a schematic drawing to show a specific example of display screens and operation in an input device of a second embodiment.

FIG. 8 is a schematic drawing to show a specific example of display screens and operation in an input device of a second embodiment. The second embodiment is a modified example of the first embodiment. The configuration of the input device in the second embodiment is similar to that in FIG. 1, but the operation is partially changed. The difference from the first embodiment will be discussed below:

For example, to display and view content of a moving image or a photo on a display screen, display of an unnecessary operation button may be temporarily erased and only content may be displayed. To operate an invisible operation button in the non-display state, the user operates the button relying on his or her memory and intuition and thus the possibility that a position shift of the operation position may occur is high and the frequency at which the user erroneously operates a different button from the objective button becomes high. Then, in the second embodiment, correction of the operation position for an operation button which may be placed in a non-display state is recognized and the effect of a command is canceled as in the first embodiment.

As shown in FIG. 8, the case where operation buttons 32A and 32B in a non-display state exist as a display screen 31c on the left of the figure, for example, and the user operates the operation buttons by touching a touch panel 10 with a finger 33 is considered. At this time, if the user operates the operation button 32A in the non-display state on the display screen 31c, the operation button 32A at the touch position of the finger 33 and operation buttons 32B and 32C existing in the proximity of the operation button 32A are changed from the non-display state to the display state as a display screen 32d at the center of the figure, and the command corresponding to the operation button 32A is executed. Accordingly, the user can visibly check the operation button 32A operated by the user and the surrounding operation buttons 32B and 32C and thus can determine whether or not the objective operation is performed. Other operation buttons not operated are displayed for a while from start of operation input and placing the operation button in the display state (in this case, the time period during which command change is possible).

If the objective operation is performed, the user continues to operate the operation button 32A as a display screen 31e in the upper right portion of the figure, whereby the command corresponding to the operation button 32A is continuously executed. Display of unnecessary operation buttons 32B and 32C other than the operation button 32A performing operation input is erased. On the other hand, if the objective operation is not performed and the user recognizes that the operation is erroneous, the user moves a move trace 34 of the finger 33 to the objective operation button 32B as a display screen 31f in the lower right portion of the figure and performs continuous input operation. In this case, the effect of the command for the operation button 32A is canceled and the command corresponding to the operation button 32B is executed as in the first embodiment.

Figure 9:
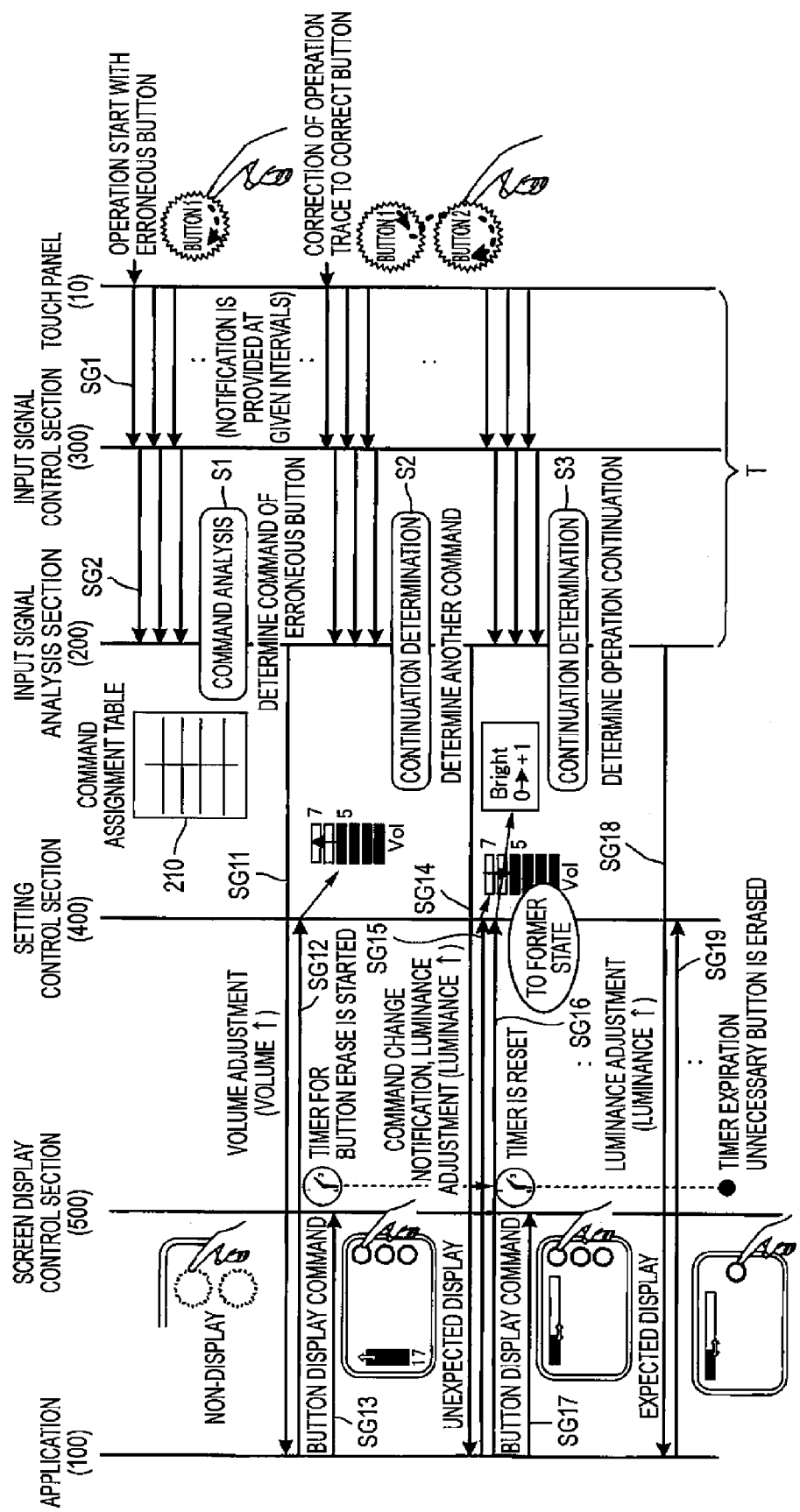
FIG. 9 is a sequence chart to show the main operation in the input device of the second embodiment.

Next, a specific processing procedure of the input device according to the second embodiment will be discussed with reference to FIG. 9. FIG. 9 is a sequence chart to show the main operation in the input device of the second embodiment.

In the second embodiment, an application 100 sends a setting control signal SG12 to a setting control section 400 based on a command signal SG11 sent by an input signal analysis section 200 with the first input operation of the user, and setting control corresponding to the command is performed. In the example in FIG. 9, the input signal analysis section 200 sends the command signal SG11 of sound voltage adjustment (volume adjustment: Sound volume increase) and the application 100 sends the setting control signal SG12 of sound volume increase to the setting control section 400, thereby executing sound voltage adjustment. At this time, the application 100 sends a display control signal SG13 of button display command to a screen display control section 500 and the screen display control section 500 switches an operation button in a non-display state to a display state. The screen display control section 500 starts a timer to measure the effective time period of button erase and command change according to input of the display control signal SG13.

As in the first embodiment in FIG. 4, when the user moves the operation position for correction, the input signal analysis section 200 detects that the operation position moves to another operation button by continuous input operation, and sends a command signal SG14 of luminance adjustment (luminance increase) to the application 100 together with command change notification. Accordingly, the application 100 sends a setting control signal SG15 of sound volume restoration to cancel the immediately preceding command (sound volume adjustment) and further sends a setting control signal SG16 of luminance increase to execute the command (luminance adjustment) corresponding to the correct input operation. The application 100 sends a display control signal SG17 of button display command to the screen display control section 500. Accordingly, the setting control section 400 cancels the effect of immediately preceding executed volume sound adjustment in accordance with the setting control signal SG15 and executes the command (luminance adjustment) after operation correction in accordance with the setting control signal SG16. The screen display control section 500 continues the display state of the operation button by a display control signal SG17 and restarts (resets) the timer.

If the screen display control section 500 detects that a predetermined time period has elapsed since the timer expired and display control signal of button display command was received, the screen display control section 500 erases unnecessary operation buttons not operated from the screen.

Figure 10:
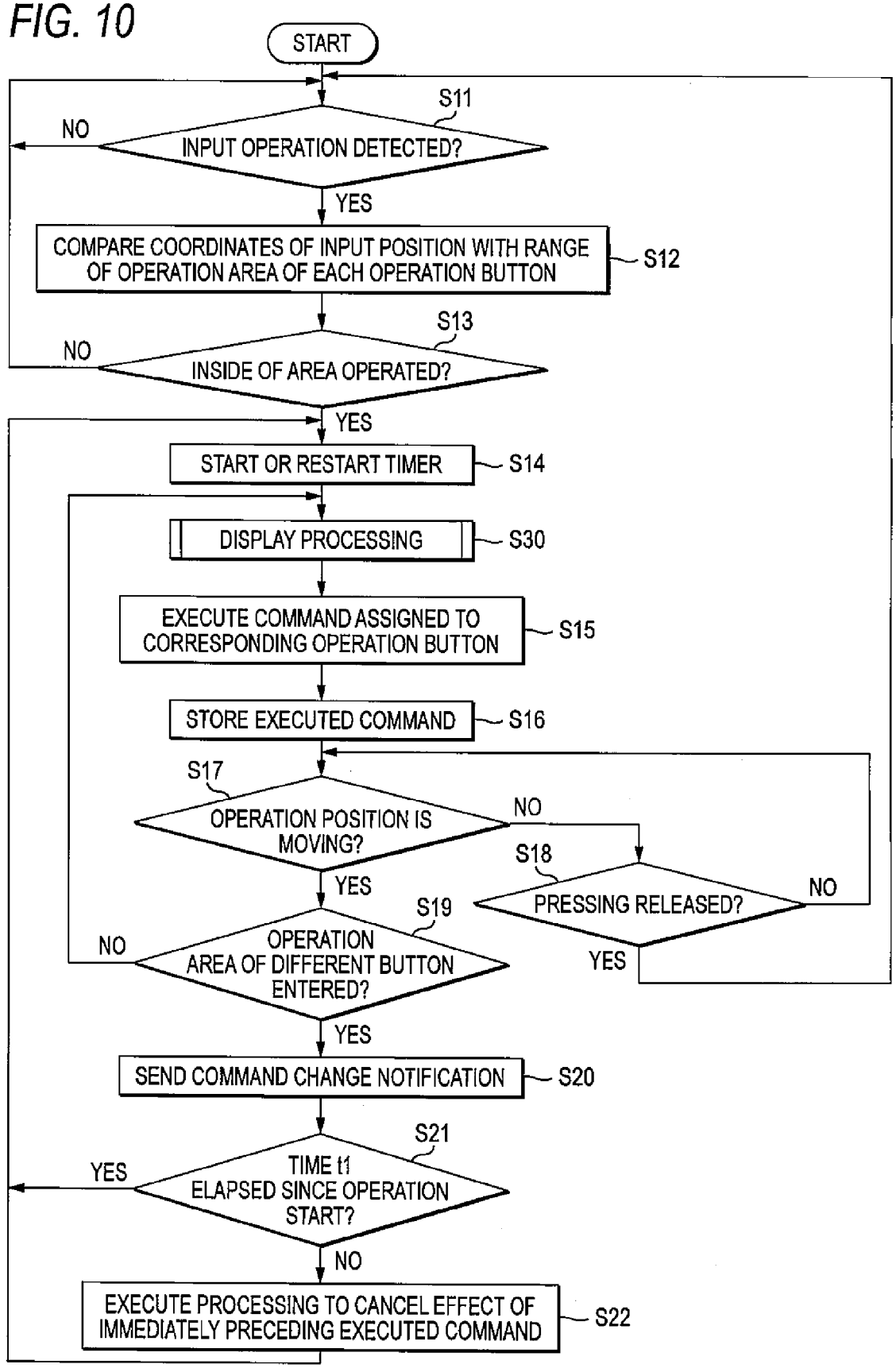
FIG. 10 is a flowchart to show processing of command execution cancel operation in the second embodiment.
Figure 11:
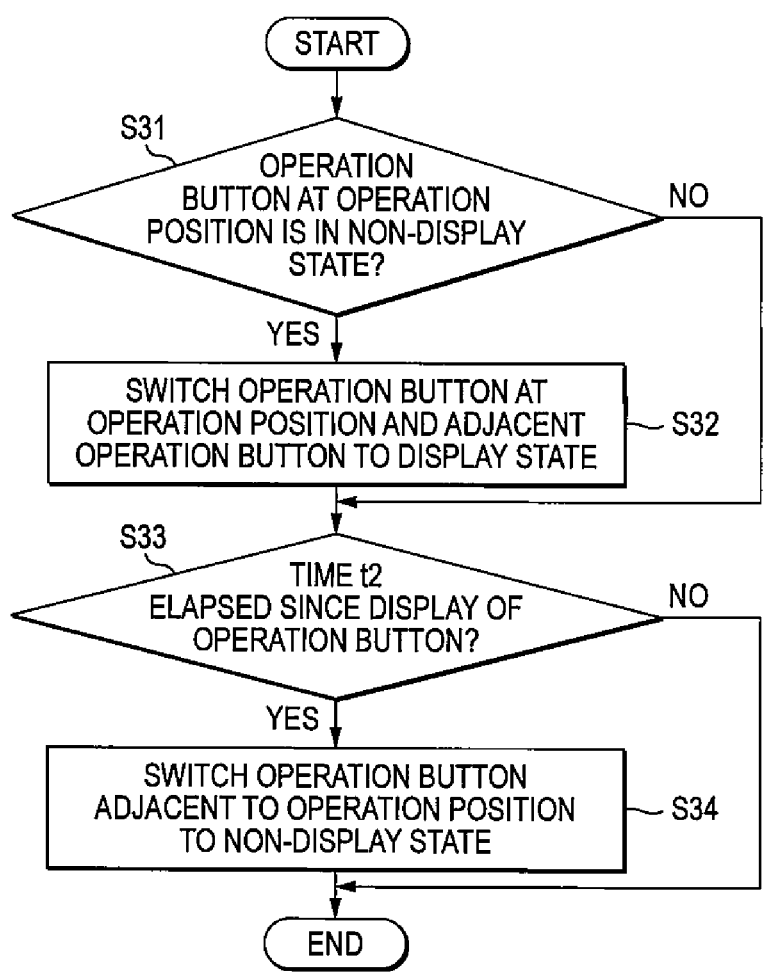
FIG. 11 is a flowchart to show processing of display processing operation in the second embodiment.

The more detailed operation of the embodiment will be discussed below with reference to FIGS. 10 and 11: FIG. 10 is a flowchart to show processing of command execution cancel operation in the second embodiment and FIG. 11 is a flowchart to show processing of display processing operation in the second embodiment. The operation shown in FIG. 10 is similar to that of the first embodiment described above except that display processing of the screen display control section 500 at step S30 is added between steps S14 and S15 in FIG. 6. The display processing at step S30 in FIG. 10 is shown in FIG. 11.

At step S31 in FIG. 11, upon reception of a button display command from the application 100, the screen display control section 500 determines whether the operation button in the area matching the operation position is in a non-display state or a display state. If the operation button is in the non-display state, the screen display control section 500 goes to step S32; if the operation button is in the display state, the screen display control section 500 goes to step S33.

At step S32, the screen display control section 500 switches the one operation button in the area matching the operation position and one or more operation buttons adjacent to the operation button from the non-display state to the display state.

At step S33, the screen display control section 500 determines whether or not the elapsed time since the button display command was received and the operation buttons were switched to the display state (elapsed time since occurrence of the button display command for the corresponding operation button) exceeds a predetermined time t2 (for example, five seconds). If the time t2 is exceeded, the screen display control section 500 goes to step S34; if the time t2 is not exceeded, the screen display control section 500 goes to step S35. If the operation target moves to a different operation button midway, the timer for counting the time t2 is reset and the display time of the operation button is again extended.

At step S34, the screen display control section 500 erases display of one or more operation buttons adjacent to the operation position and switches the state to the non-display state.

For example, if the user touches the position of the operation button 32A in the non-display state in the state of the display screen 31c as shown in FIG. 8, step S32 in FIG. 11 is executed and the corresponding operation button 32A and the two operation buttons 32B and 32C in the proximity of the operation button 32A are switched from the non-display state to the display state as the display screen 31d. The corresponding command is executed for the operation of the operation button 32A.

When the time t2 has elapsed since the operation of the operation button 32A was started, step S34 in FIG. 11 is executed and the display state of the operation button 32A at the operation position is maintained as the display screen 31e and the corresponding command is continuously executed, but the two operation buttons 32B and 32C in the proximity of the operation button 32A are erased and are switched to the non-display state. If the user moves the finger 33 and corrects the operation position by continuous input operation as the display screen 31f in FIG. 8, step S22 in FIG. 10 is executed and the effect of the immediately preceding executed command is canceled.

The operation example shown in FIG. 8 assumes the case where processing of cancelling the effect of the immediately preceding executed command by operation position correction of continuous input operation is applied to the operation button involving the possibility that it may be placed in the non-display state, but the processing may be applied to an operation button whose display area is not clear. For example, when the shape of the contours of the operation button is complicated, when display of the operation button has gradation, or when the contrast between display of the operation button and the background is small, etc., the range of the operation button becomes unclear and thus a position shift may occur in input operation. In such a case, there is a possibility that erroneous operation may occur and thus cancel processing of restoring the preceding operation result to the former state when the operation position is corrected becomes necessary.

In the input device of the embodiment, when the operation button is switched from the non-display state to the display state with input operation of the user, for example, other peripheral operation buttons are also displayed with the operation button at the operation position and if the user continuously operates another operation button, the effect of the command executed by the immediately preceding operation can be canceled and the operability at the operation correction and cancel time can be improved. Command cancel is made effective for a predetermined time from input operation of the user or while another operation button is displayed, and later, command cancel is made ineffective, so that acceptance of command cancel is limited and intentional cancel operation of the user and any other operation can be clearly distinguished. Other operation buttons on the periphery of the operation position are displayed, whereby the time and labor for finding the objective button can be decreased and correction of the operation position can be facilitated.

(Third Embodiment)

Figure 12:
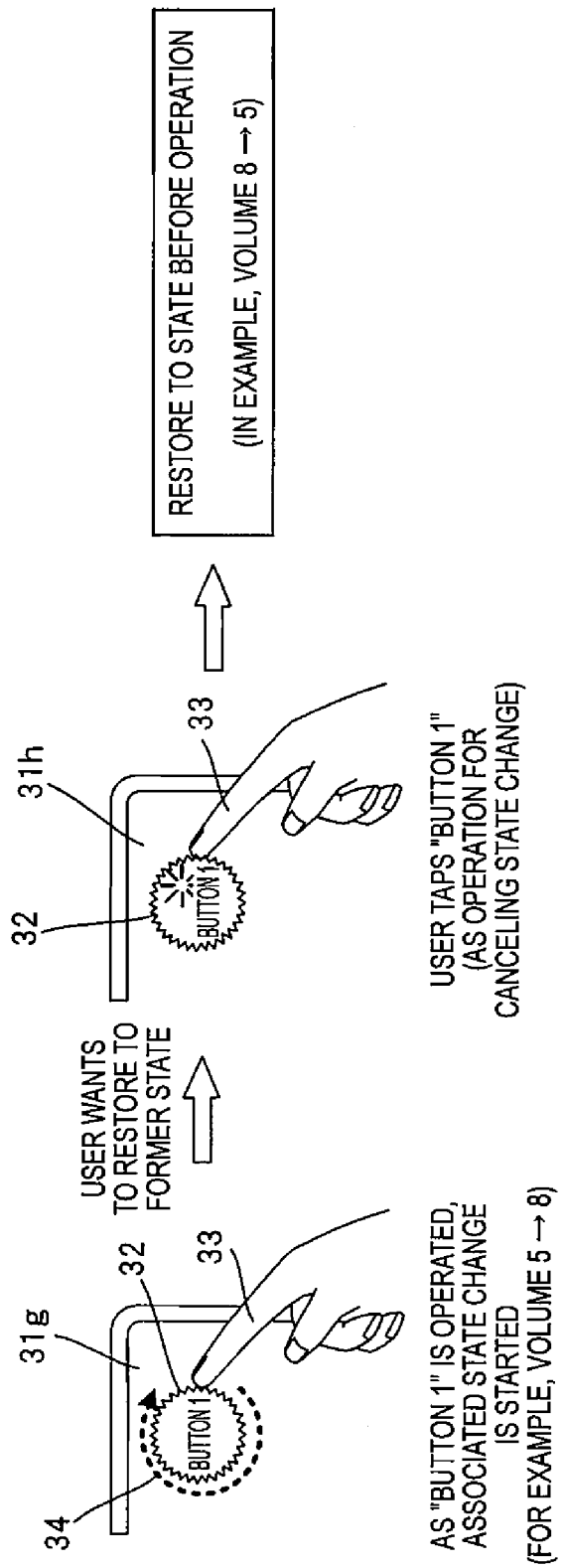
FIG. 12 is a schematic drawing to show a specific example of display screens and operation in an input device of a third embodiment.

A further modified example of the first and second embodiments described above will be discussed as a third embodiment. FIG. 12 is a schematic drawing to show a specific example of display screens and operation in an input device of a third embodiment.

The example in FIG. 12 assumes the case where one operation button 32 is displayed on a display screen and drag operation by rotation operation as usual operation is assigned to the operation button 32. In this case, if the user moves a finger 33 so as to draw a circular arc on the operation button 32 and draws a move trace 34 as a display screen 31g, a command assigned to the operation button 32 is executed. For example, volume (sound volume) changes from 5 to 8. Here, if the user is aware of erroneous operation and taps the finger 33 on the operation button 32 (releases the finger 33 from a touch panel 10 and again presses the touch panel) as a display screen 31h to cancel the operation. The input device assumes it to be cancel operation and cancels the effect of the immediately preceding executed command. In the sound volume adjustment, the volume (sound volume) is restored from 8 to 5.

Figure 13:
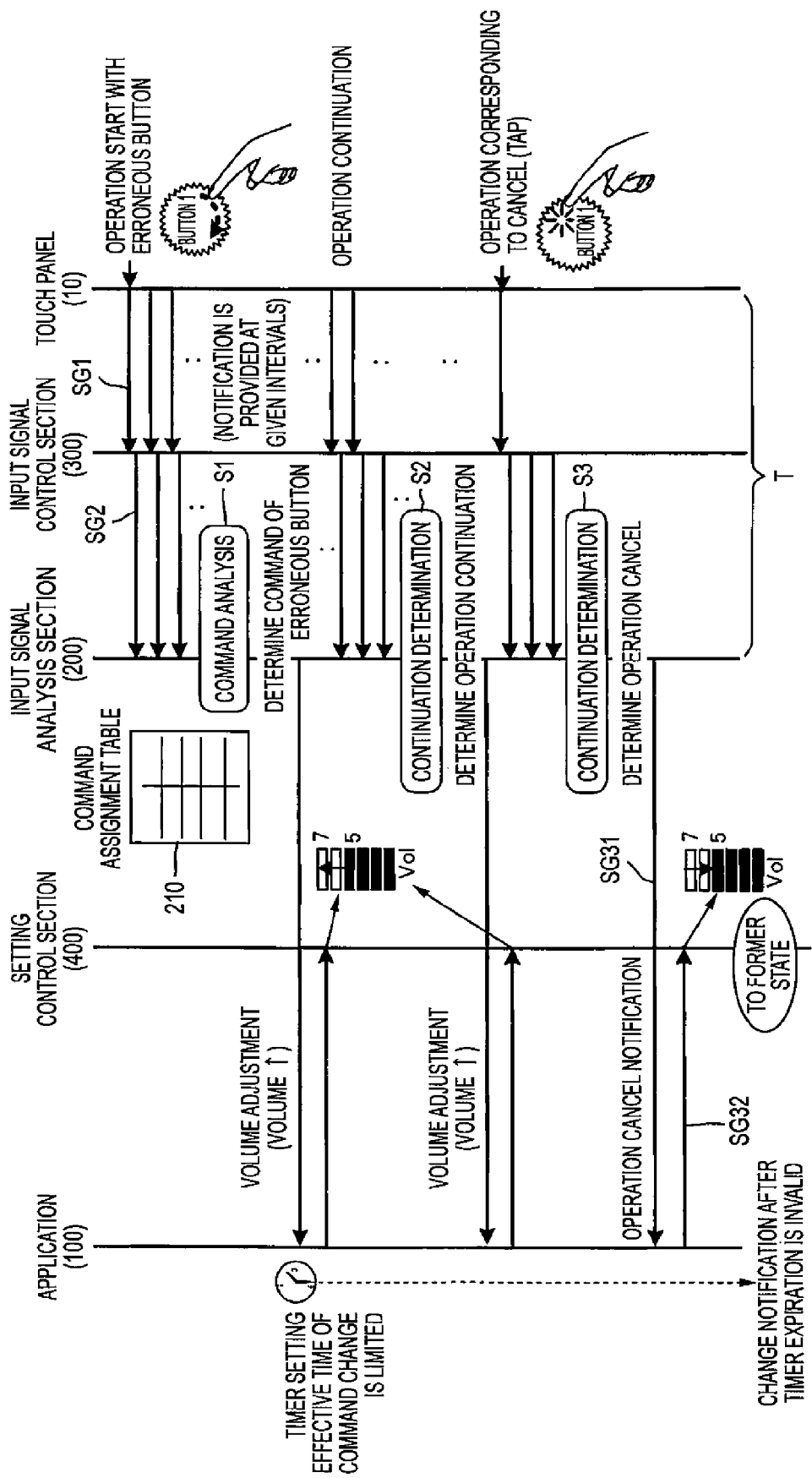
FIG. 13 is a sequence chart to show the main operation in the input device of the third embodiment.

FIG. 13 is a sequence chart to show the main operation in the input device of the third embodiment. FIG. 13 shows the case where the sound volume is adjusted to execute a command in response to erroneous operation of the user as in the first embodiment in FIG. 4 at steps S1 and S2 and tapping operation of the user is detected at step S3. At this time, when detecting tapping, an input signal analysis section 200 determines that the operation is cancel operation of the preceding operation, and sends operation cancel notification to an application 100 by a command signal SG1. Upon reception of the operation cancel notification, the application 100 sends a setting control signal SG32 to a setting control section 400 for restoring the sound volume adjustment of the preceding command to the state before the operation. Also in this case, when a predetermined time has elapsed since the first input operation was detected, if tapping operation is detected, command cancel (operation cancel) is made ineffective.

Thus, in the input device of the embodiment, the user need not select a special command from a menu to cancel erroneous operation and can give a command cancel command simply by performing cancel operation of tapping, etc., without largely moving the finger 33 from the corresponding operation button 32.

It is to be understood that the invention is not limited to the items shown in the embodiments described above and the invention is also intended for those skilled in the art to make modifications and application based on the Description of the invention and well-known arts and the modifications and the application are contained in the scope to seek protection.

In the embodiments described above, it is assumed that the touch panel 10 is used as the input section and the coordinates of the input position are detected in the input position detection section, but any other input device may be used for the input section in place of the touch panel 10 and the input position may be detected if it has an input function having input position information. For example, a mouse cursor is displayed on a screen and the display position of the mouse cursor is moved with operation of an input device of a mouse, etc., and the coordinates of the input position can also be recognized for operation of click of the display position of the mouse cursor, etc.

The input device of the embodiment can implemented as dedicated hardware only of an electronic circuit, etc., or can also be made up of a computer including a control processor and memory, etc., and a program executed in the computer in combination.

The input device of the embodiment is installed in an electronic device such as a mobile telephone terminal, a portable music player, or a portable gaming machine including a loudspeaker, a receiver, or an external AV output, whereby the advantages of the embodiment are provided in the electronic device. For example, for operation of setting the output value of a sound such as the sound volume or the sound quality, selection of output content, or the like, even in a state in which an object of a button, a switch, etc., is not displayed, of an unobjective command is executed by erroneous operation, etc., it is made possible to easily cancel the effect of the already executed command. If content includes an image, when an object is placed in the non-display state, etc., while the user does not perform any operation, if an unintentional command is executed by erroneous operation, etc., the effect of the command can be easily canceled and a useful electronic device can be implemented. The input device is useful not only for an output device of a loudspeaker, etc., but also for setting in an electronic device, for example, selection of a telephone directory or content, viewing operation of a Web page, etc.

This application is based on Japanese Patent Application (No. 2007-340243) filed on Dec. 28, 2007, which is incorporated herein by reference.

<Industrial Applicability>

The invention has the advantages that if an unobjective command is executed for input operation of the user, it is made possible to cancel the effect of the already executed command without performing burdensome operation, and is useful in an input device, an input operation processing method, an input control program, etc., of an electronic device that can be used for input operation in an electronic device such as a mobile telephone terminal, a portable information terminal (PDA), a portable music player, or a portable gaming machine, for example.

The invention claimed is:

1. An input device of an electronic device, comprising:
an input section having an input function having input position information; and
an input control section configured to give a command of processing for input operation based on an input signal of said input section,
wherein said input control section includes:
an input position detection section configured to detect an input position in said input section;
a command execution control section configured to execute a first command concerning a first function assigned to a first said input section and a second command concerning a second function different from the first function assigned to a second area different from the first area;
an input signal analysis section configured to give a command of execution of the first command if input operation to the first area is detected and giving a command of execution of the second command if input operation to the second area is detected based on the input position detected by the input position detection section; and
an input operation cancel control section configured to execute cancel processing to cancel the effect of an immediately preceding executed first command in response to detection of continuous input operation for a predetermined time period to the second area after execution of the immediately preceding first command with detection of input operation to the first area by the input signal analysis section.

2. The input device of the electronic device as claimed in claim 1, comprising a display section that displays a visible information concerning input operation; and a touch panel having an input function based on contact operation with an input face corresponding to a display screen of the display section as said input section, wherein in response to detection of continuous operation for a predetermined time period of a contact state from the first area to the second area, the input signal analysis section determines that the operation is continuous input operation from the first area to the second area.

3. The input device of the electronic device as claimed in claim 1, wherein in response to detection of continuous input operation to the second area within a predetermined time from the detection time of the input operation start to the first area or the execution time of the first command accompanying the input operation, the input operation cancel control section executes the cancel processing and makes the cancel processing ineffective after a lapse of the predetermined time.

4. The input device of the electronic device as claimed in claim 1, comprising a display section that can display visible information concerning input operation; and a screen display control section for controlling the display state of an object to be operated displayed on a display screen of the display section, wherein the screen display control section displays objects to be operated at display screen positions corresponding to operation areas containing the first area and the second area, and in response to the object being in a non-display state and input operation to the corresponding area being detected, places some or all of the objects containing the object corresponding to the input position in a display state, and wherein in response to input operation to the second area being detected within a predetermined time from the detection time of the input operation start to the first area or the execution time of the first command accompanying the input operation, the input operation cancel control section executes the cancel processing and makes the cancel processing ineffective after a lapse of the predetermined time.

5. The input device of the electronic device as claimed in claim 4, wherein in response to the object being in the non-display state and input operation to the corresponding area being detected, the screen display control section places the object corresponding to the input position and at least one different object in a display state and places the object other than the object corresponding to the input position in the non-display state when a predetermined time has elapsed since the display state, and wherein when the different object is in the display state, in response to input operation to the different object being detected, the input operation cancel control section determines that the operation is continuous input operation from the first area to the second area and executes the cancel processing and in response to an object other than the object corresponding to the input position being switched from the display state to the non-display state, makes the cancel processing ineffective.

6. The electronic device as claimed in claim 4, wherein in the event that the input to the second area is not detected within the predetermined time from the detection of the input to the first area, the input operation cancel control section does not cancel the first command.

7. An electronic device installing an input device as claimed in claim 1.

8. An input operation processing method in an input device of an electronic device, comprising an input section having an input function having input position information and an input control section for giving a command of processing for input operation based on an input signal of said input section, in the input control section, said input operation processing method comprising:
an input position detection step of detecting, by a touch panel, an input position in the input section;
a command execution control step of executing a first command concerning a first function assigned to a first area in the input section and a second command concerning a second function different from the first function assigned to a second area different from the first area based on input operation;
an input signal analysis step of giving a command of execution of the first command in the event that input operation to the first area is detected and giving a command of execution of the second command in the event that input operation to the second area is detected based on the input position detected by said input position detection step; and
an input operation cancel control step of executing cancel processing to cancel the effect of the immediately preceding executed first command in the event that continuous input operation for a predetermined time period to the second area is detected after execution of the first command with detection of input operation to the first area by said input signal analysis step.

9. The method according to claim 8, further comprising:
displaying visible information concerning input operation; and
controlling a display state of the visible information,
wherein the visible information comprises a first object associated with the first area and a second object associated with the second area, and in the event that the first object or the second object is in a non-display state, and a corresponding input to the first area or the second area is received, transitioning the first object or the second object to a display state, and
in the event that the input to the second area is detected within a predetermined time from the detection the input to the first area, the input operation cancel control section cancels the first command.

10. The method according to claim 9, further comprising:
in the event that the first object is in the non-display state, and in response to the input to the first area being detected, placing the second object and the first object in the display state, and placing the first object in the non-display state after a predetermined time has elapsed since the placement to the display state; and
in the event that the second object is in the display state, and in response to the input to the second object being detected, cancelling the first command.

11. An input device of an electronic device, comprising:
an input section configured to receive an input operation of a user to a predetermined area of the input section;
a command assignment table configured to register at least a first area in the input section and a first command assigned to the first area and a second area in the input section and a second command assigned to the second area, the first area and the second area being different from each other, and the first command and the second command being different from each other; and
a control section configured to execute the first command and the second command,
wherein, in the event that, after an input operation to the first area, continuous input operation for a predetermined time period is done to the second area, the control section, after executing the first command in response to detection of the input operation to the first area, cancels the effect of the executed first command in response to detection of the continuous input operation for the predetermined time to the second area and executes the second command that is assigned to the second area.

12. The input device of the electronic device according to claim 11, further comprising a display section configured to display a visible information concerning input operation, and an the input signal analysis section configured to determine operation of the input section by the user, and wherein the input section comprises a touch panel having an input function based on contact operation with an input face corresponding to a display screen of the display section, wherein in response to detection of continuous operation of a contact state from the first area to the second area, the input signal analysis section determines that the operation is a continuous input operation from the first area to the second area.

13. An input device of an electronic device, comprising:
- an input section configured to receive an input operation of an user to a predetermined area;
- a display section configured to display an object relating to input operation by the user; and
- a control section configured to execute a first command assigned to a first area in the input section and a second command assigned to a second area in the input section, the first area and the second area being different from each other, and the first command and the second command being different from each other,
- wherein, in the event that objects in the first area and the second area are in non-display state, and after an input operation to the first area, continuous input operation for a predetermined time period is done to the second area, the control section, after executing the first command assigned to the first area in response to detection of the input operation to the first area, cancels the effect of the executed first command in response to detection of the continuous input operation for the predetermined time period to the second area and executes the second command that is assigned to the second area.

14. The input device of the electronic device according to claim 13, wherein, in the event that objects in the first area and the second area are in non-display state, and after an input operation to the first area, continuous input operation for a predetermined time period is done to the second area, the control section, after executing the first command assigned to the first area in response to detection of the input operation to the first area, cancels the effect of the executed first command in response to detection of the continuous input operation for the predetermined time period to the second area and executes the second command that is assigned to the second area, and places some or all of the objects containing the object corresponding to the continuous input operation to the second area in a display state.

15. The input device of the electronic device according to claim 13, wherein:
- in the event that the input operation to the second area is detected within a predetermined time from a time of detection of the start of input operation to the first area or a time of execution of the first command accompanying the input operation to the first area, the control section cancels the effect of the first command, and
- in the event that the input operation to the second area is not detected within a predetermined time from a time of detection of the start of input operation to the first area or a time of execution of the first command accompanying the input operation to the first area, the control section does not cancel the effect of the first command.

* * * * *